United States Patent [19]
Van Essen

[11] Patent Number: 5,871,241
[45] Date of Patent: Feb. 16, 1999

[54] RELEASABLE COUPLING FOR FLUID LINES

[75] Inventor: Frederick H. Van Essen, Brighton, Australia

[73] Assignee: Alfagomma Australia PTY Ltd., Victoria, Australia

[21] Appl. No.: 735,028

[22] Filed: Oct. 22, 1996

[30] Foreign Application Priority Data

Oct. 27, 1995 [AU] Australia ................................. PN6215

[51] Int. Cl.$^6$ .................................................. F16L 21/08
[52] U.S. Cl. ........................ 285/377; 285/277; 285/314; 285/360; 285/401
[58] Field of Search ................................... 285/272, 277, 285/280, 278, 330, 913, 305, 309, 310, 314, 360, 376, 401, 377, 319, 402

[56] References Cited

U.S. PATENT DOCUMENTS

| 761,643 | 6/1904 | Backman | 285/377 |
|---|---|---|---|
| 1,673,723 | 6/1928 | Van Arsdale | 285/377 |
| 1,724,822 | 8/1929 | Brown | 285/377 |
| 2,305,841 | 12/1942 | Carlson | 285/377 |
| 3,162,470 | 12/1964 | Davidson et al. | 285/376 |
| 4,193,576 | 3/1980 | White | 285/377 |
| 4,566,723 | 1/1986 | Schulze et al. | 285/361 |
| 4,632,433 | 12/1986 | Kimura | 285/361 |

FOREIGN PATENT DOCUMENTS 4272  1/1908  United Kingdom .................. 285/377

Primary Examiner—Eric K. Nicholson
Attorney, Agent, or Firm—Ladas & Parry

[57] ABSTRACT

A coupling for interconnecting two fluid flow lines includes a first coupling member (1) having a male end (4) and a second coupling member (2) having a female end (17) within which a rotatable collar (3) is held captive. The male end (4) includes four equally circumferentially spaced lobes (16) and the collar (3) has a cylindrical portion (3) that is shaped at its inner end to provide a square cross-section (35) to allow passage of the lobes (16) therethrough. The end rim (33) of collar (3) is recessed (37, 38) whereby upon insertion of male end (4) through collar (3) and rotation of the collar, the lobes (16) can seat within the recesses (37, 38), thereby releasably interconnecting the first and second coupling members (1, 2). Each recess in the end (33) of collar (3) has a first portion (37) and a second, deeper, portion (38) such that when the first member (1) is axially moved in a separating direction, the lobes (16) can seat within the deeper recess portions (38) to prevent relative rotation between collar (3) and male end (4) thereby locking the first member (1) to the second member (2). This prevents accidental release of the coupling, particularly in high pressure applications. The interengagement of lobes (16) and recesses (37–38) provides four pressure bearing contact surfaces allowing design of a coupling to withstand pressure of about 3445 N/cm$^2$ (5000 psi).

12 Claims, 2 Drawing Sheets

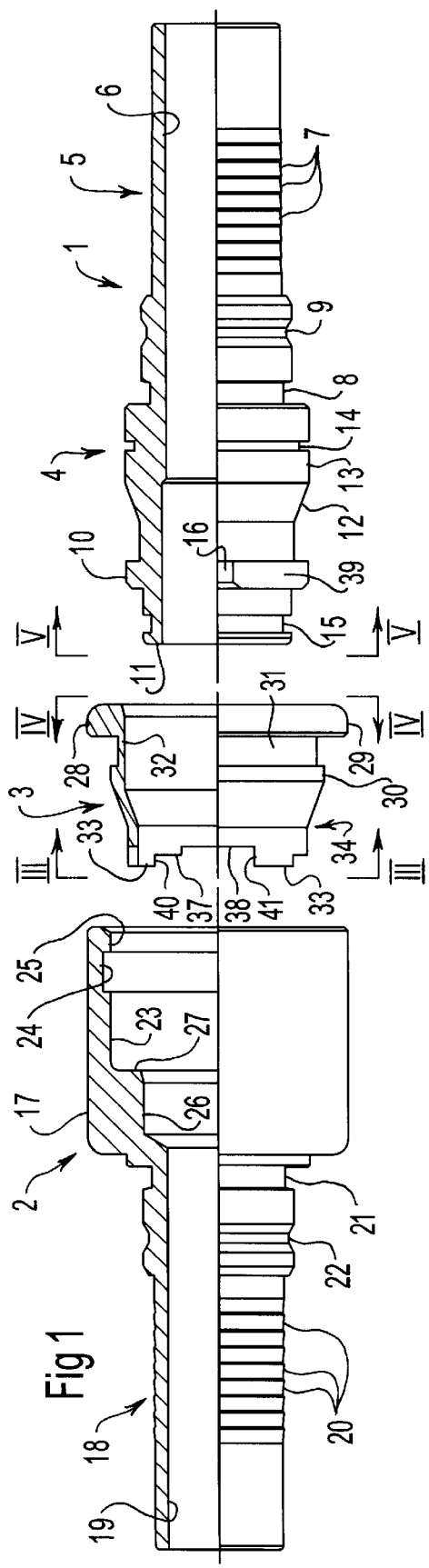
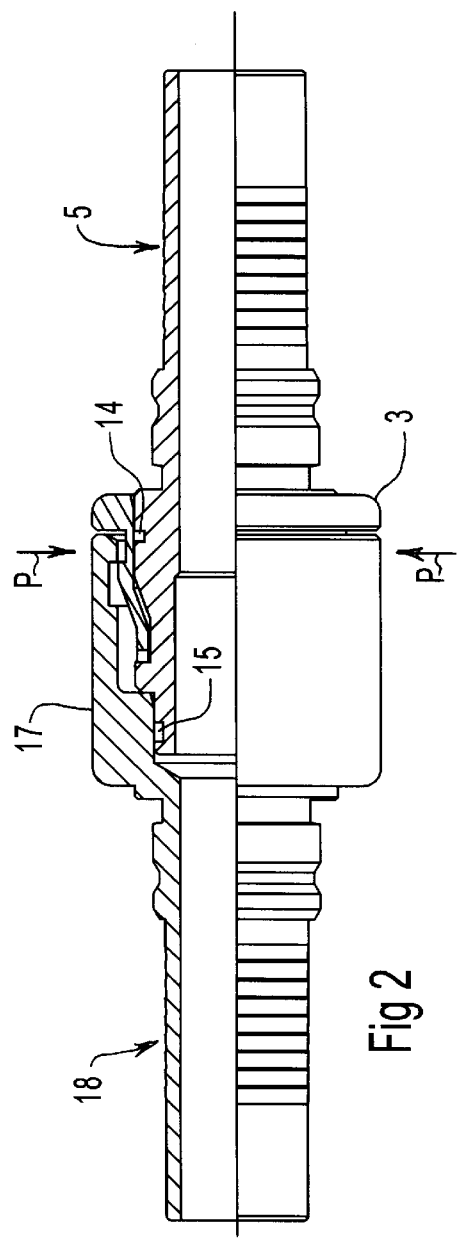
Fig 1
Fig 2

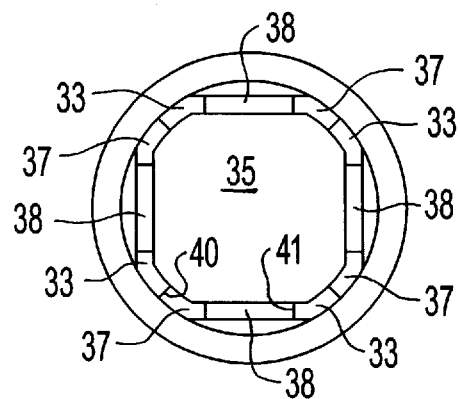
Fig 3
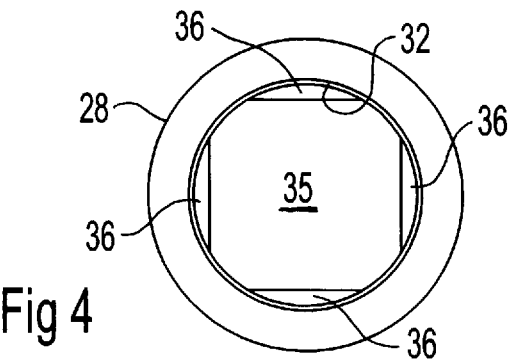
Fig 4
Fig 5

5,871,241

RELEASABLE COUPLING FOR FLUID LINES

TECHNICAL FIELD

This invention relates to a releasable coupling for fluid lines and in particular to a coupling that provides for quick connection and quick release between a male coupling member and a female coupling member for interconnecting two fluid flow lines. The invention is particularly suitable for use in interconnecting hoses for use in high pressure applications, for example for conveying fluids at pressures of about 3445 $N/cm^2$ (5000 psi), and it will be described with reference to this example application. However it is to be understood that the invention is of general application and can be used for interconnecting lines of various sizes for conveying water, air, hydraulic oils, gases etc. at various pressures.

BACKGROUND ART

Couplings for interconnecting fluid flow lines and holding them together under high pressures, as are used for example for supplying high pressure fluids to underground mining equipment, are known wherein a male and a female coupling member are locked together by a staple or pins. An example of such a staple-lock coupling is disclosed in Australian Patent No. 559081 (14879/83). These known staple-lock couplings are not readily able to be uncoupled in that generally separate tools have to be used to remove the staple. Furthermore, as the staple usually protrudes from the coupling, it can catch on to other pieces of equipment if the flow lines and coupling are dragged around. This can create a dangerous situation in that if sufficient force is applied to the staple it could be pulled out of the coupling causing the male and female coupling members to come apart. Should this occur while the fluid line is pressurised, a dangerous ejection of the pressurised fluid could occur, particularly if the supply side coupling member is not restrained. It is generally desirable that a coupling for use in high pressure applications and which is likely to be moved around, as in mining applications, not have any protrusions. Pin or staple-lock couplings also contain transverse holes for accommodating the pins or staple and this is undesirable because such holes provide possible entry points for water, dust etc. which may adversely affect the coupling.

DISCLOSURE OF THE INVENTION

The present invention provides a coupling that is connectable and disconnectable by hand, thereby avoiding the use of a staple or pins and their attendant problems.

An embodiment of the invention furthermore provides for the male and female coupling members to be locked together when interconnected such that accidental release of the coupling is prevented. This embodiment is particularly suitable for use in high pressure or high fluid flow applications where accidental release of the coupling cannot be tolerated because of safety concerns. This embodiment also includes the feature that significant torsional movement between the interconnected lines can be accommodated.

According to the invention there is provided a coupling for interconnecting fluid flow lines including, a first tubular coupling member having a male coupling end and an opposite end for connection to a fluid flow line, a second tubular coupling member having a female coupling end and an opposite end for connection to a fluid flow line, the female coupling end including a rotatable collar for receiving the male coupling end of the first member, wherein the male coupling end of the first member and the rotatable collar of the second member include interengageable means for releasably interconnecting the male coupling end of the first member within the female coupling end of the second member by a partial rotation of the collar relative to the first member, the interengageable means being provided by a shaped portion of the male coupling end of the first member and a shaped portion of the rotatable collar of the second member.

Preferably the shaped portions of the male coupling end of the first member and the rotatable collar of the second member provide for a plurality of interfacing pressure bearing contact surfaces.

Preferably the rotatable collar is shaped to allow limited axial movement of the first member relative to the second member in a separating direction to lock the first and second members together in an interconnected position whereby separation of the first member from the second member is prevented unless and until the first member is axially moved back to an unlocking position. In use, the limited axial movement of the first member from its unlocked to its locked position may be ensured by the fluid pressure within the coupling. Also, when the first member is in its locked position, rotation of that member relative to the collar of the second member is prevented.

The shaped portion of the male coupling end of the first member may include at least one lateral shoulder structure and the shaped portion of the rotatable collar of the second member may include a recess for receiving the said shoulder structure. Preferably a plurality of such shoulder structures, which are peripherally arranged, are provided on the first member and the rotatable collar includes a corresponding number of recesses for receiving the shoulder structures. An embodiment having such a plurality of interengageable means gives the potential for designing a coupling to withstand pressures in excess of 5000 psi.

Preferably the or each recess of the rotatable collar is formed in an axially facing end rim surface of the rotatable collar located within the female coupling end of the second member, the collar being shaped to allow passage of the shoulder structure(s) of the first member therethrough. Preferably the or each recess includes a first portion and a second deeper portion whereby, when the male coupling end of the first member is fully inserted into the female coupling end of the second member, the collar is rotatable such that the shoulder structure(s) of the first member engage in the recess(es) and, when the first member is then axially moved in a separating direction, the shoulder structure(s) seat within the second deeper portion of the recess(es) to lock the first member to the second member. That is, the second deeper portion of the or each recess in the rotatable collar defines the locking position of the first member relative to the second member.

BRIEF DESCRIPTION OF DRAWINGS

An embodiment of the invention will now be described, by way of non limiting example only, with reference to the accompanying drawings. The specific form and arrangement of the features of the invention as shown in the drawings is not to be interpreted as limiting on the invention, the full scope of which is to be determined according to the generality of the preceding description.

In the drawings:

FIG. 1 is an exploded view of the components of a coupling embodying the invention, wherein half sectioned views of the components are shown;

FIG. 2 is a half sectioned view of the coupling of FIG. 1 in its assembled, but unlocked condition;

FIG. 3 is an end view of the coupling of FIG. 1 in the direction III—III; shown in FIG. 1; and FIG. 4 is an end view of the coupling of FIG. 1 in the direction IV—IV shown in FIG. 1.

FIG. 5 is an end view of the coupling of FIG. 1 in the direction V—V shown in FIG. 1.

DETAILED DESCRIPTION OF AN EMBODIMENT OF THE INVENTION

The components of a coupling according to an embodiment of the invention as shown in FIG. 1 include a first tubular coupling member 1, a second tubular coupling member 2 and a rotatable collar 3. The first tubular member 1 is of single piece construction and is generally cylindrical. It includes a male coupling end 4, an opposite end 5 which is adapted for connection to a fluid flow line, and an axial fluid flow passage 6. The adaptation of end 5 for connection to a fluid flow line may include the provision of a series of circumferential grooves 7 to define a series of barbs for gripping the internal surface of a hose (not shown). The first member 1 may also include circumferential grooves 8 and 9 for use in making an interlocking high pressure hose connection to end 5. It is to be understood that any other adaptation of end 5 for connection to a fluid flow line, as known in the art and suitable for the intended application of the coupling, may be used in place of the illustrated arrangement.

The male end 4 of first member 1 includes shoulder structures 10 spaced rearwardly of a front end rim surface 11, and a tapered section 12 leading to a larger diameter section 13 within which a groove 14 is formed for reception of a sealing means, such as an O ring (not shown). Another groove 15 is formed in member 1 just rearwardly of surface 11 also for reception of a sealing means such as an O ring (not shown).

The shoulder structures 10 comprise four lobes 16 (only one of which is labelled in FIG. 1) that are equally spaced circumferentially of the tubular first member 1. These lobes 16 can be formed by milling away portions of an annular flange provided on male end 4 of member 1 to form opposite flats (reference 39 in FIG. 1 shows one such flat), thereby leaving lateral shoulder structures 10 in the form of the four lobes 16. The diameter of such an annular flange may be substantially the same as that of cylindrical section 13 of first member 1. It is to be understood that the invention encompasses the provision of a lesser or a greater number of shoulder structures 10 than the four of this embodiment.

The second tubular coupling member 2 is also of single piece construction and is generally cylindrical. It includes a female coupling end 17, an opposite end 18 for connection to a fluid flow line and an axial fluid flow passage 19. End 18 may include a series of grooves 20 for the same purpose as grooves 7 of member 1, and grooves 21 and 22 for the same purpose as grooves 8 and 9 of member 1. Similarly to end 5 of member 1, end 18 of member 2 may include any other suitable arrangement for connection to a fluid flow line in place of that which is illustrated.

Female coupling end 17 of member 2 is provided by an enlarged diameter cylindrical section, a front portion of which has an internal surface 23 having a diameter for reception of collar 3. An annular recess 24 is formed in the inner surface 23 to provide an inwardly orientated annular lip 25 at the entrance to the cylindrical section female coupling end 17 for a purpose to be described hereinafter.

The enlarged diameter section of female coupling end 17 has a rearward portion having an internal surface 26 of lesser diameter than that of portion 23 such that an abutment surface 27 is formed between the front portion 23 and rearwards portion 26. The diameter of cylindrical surface 26 is such that it can slidingly receive (that is, there is some clearance for example of the order of 0.1 mm) that portion of the male coupling end 4 of the first member 1 in front of the shoulder structures 10.

Rotatable collar 3 is also of single piece construction and of generally cylindrical form. It may be formed from cylindrical stock that is machined to provide an annular flange 28 at one end having an outside diameter substantially the same as that of the cylindrical section of female coupling end 17 of member 2. Flange 28 is suitably rounded at its leading edge and the outer surface of the flange may be knurled, as at 29, to facilitate it being gripped for manual rotation of the collar by an operator.

Collar 3 includes a cylindrical portion 30 extending from flange 28, the diameter of which allows this portion to be received within portion 23 of female coupling end 17 with sufficient clearance for the collar to be rotated within the female end 17. The amount of clearance may be, for example, about 0.1 to 0.5 mm. Within portion 30 and immediately behind flange 28 is formed an annular recess 31 for a purpose to be described hereinafter. The internal diameter 32 of flange 28/portion 30 of collar 3 is such that it slidingly receives (that is, there is some clearance for example of the order of about 0.1 mm) the larger diameter section 13 of male coupling end 4 of tubular member 1.

The rearwards most portion 34 of collar 3, that is, the portion extending from cylindrical portion 30 to an end rim surface 33, is shaped to provide a generally square section passage 35 (see FIGS. 3 and 4). Such shaping can be accomplished for example by crimping. With reference to FIGS. 3 and 4, passage 35 is defined by opposite flats 36 provided in portion 34 that taper inwardly towards end rim 33. Passage 35 is sized such that it will allow lobes 16 of male end 4 of member 1 to pass therethrough. It will be appreciated that lobes 16 on member 1 define a generally square section of complementary size to passage 35.

The end rim surface 33 of collar 3 has four recesses cut therein. Each recess includes a first portion 37 having a first depth and a second portion 38 having a second depth. The first portion of each recess has an end edge 40 and the second portion of each recess has an end edge 41. Inspection of FIG. 3 will reveal that the deeper second portions 38 of the four recesses are in the end rim surface 33 that is flattened and that the shallower first portions 37 extend to about midway between adjacent flats 36.

It will be appreciated that the lobes 16 of first member 1 and the flats 36/recesses 37–38 of the collar 3 provide an example of interengageable means of the invention for releasably interconnecting the male coupling end of the first member within the female coupling end of the second member. The functioning of these interengageable means will be described herein below.

Collar 3 is permanently assembled with the second tubular member 2 such that it is rotatable relative thereto by inserting portions 34–30 into female coupling end 17 until flange 28 contacts the entrance rim surface thereof whereupon pressure is applied circumferentially to the female end 17, as shown by arrows P in FIG. 2, to deform the material thereof such that annular lip 25 enters recess 31. The amount of deformation is such that annular lip 25 holds collar 3 captive whilst permitting it to be readily rotated by hand relative thereto.

To assemble the coupling, male end 4 of the first member 1 is inserted into collar 3 of the second member 2 until the leading axially facing surfaces of lobes 16 contact abutment surface 27 inside female coupling end 17 of member 2. As the cross-sectional shape of male end 4 at lobes 16 is complementary to the cross-sectional shape of passage 35, that portion of male end 4 up to and including lobes 16 can pass through the rotatable collar 3 when these cross-sectional shapes are complementarily aligned. The axial length of portions 30–34 of collar 3 is such that, upon insertion of male end 4, end edges 40 of the four recesses 37–38 effectively prevent rotation of collar 3 in one direction (in an anticlockwise direction as viewed in direction IV—IV in FIG. 1) because each comes into contact with an edge of an adjacent lobe 16, however rotation of collar 3 in the opposite direction is not prevented because of the clearance for the lobes 16 provided by the recesses 37–38. Thus, after insertion of male end 4 of member 1 into female end 17 of member 2, collar 3 can be rotated relative thereto until an end edge 41 of each of the recesses 37–38 contacts an edge of the adjacent lobe 16, whereupon the lobes 16 will be aligned with the flats 36 of collar 3 and withdrawal of the first member 1 from the second member 2 is prevented because the rear facing axial surfaces of the lobes 16 will contact the "bottom" surfaces of recesses 37–38. It is to be understood that the rear facing axial surfaces of the lobes 16 and the bottom surfaces of recesses 37–38 provide interfacing pressure bearing contact surfaces as mentioned hereinabove. In this embodiment these surfaces provide four pressure bearing contact areas.

The length of the second portions 38 of these recesses is such that each will accommodate the width of a lobe 16, and their depth (i.e. the second depth) relative to the thickness of lobes 16 is such that a small amount of axial movement of member 1 in a separating direction is possible. Thus, with such an axial movement of member 1 in a separating direction, the lobes 16 will be received within the second portions 38 of the recesses 37–38 thereby locking the first and second members 1 and 2 together in an interconnected position. It will be appreciated that when so locked together, it is not possible to rotate member 1 relative to collar 3, therefore member 1 cannot be uncoupled from member 2 until it is axially moved back to unseat lobes 16 from recess portions 38 thereby clearing the way for lobes 16 to be moved relative to collar 3 to an uncoupling position via recess portions 37. It will be furthermore appreciated that when members 1 and 2 are interengaged and locked together, the member 1 and collar 3 assembly is rotatable relative to member 2 thereby permitting relative torsional movement of the fluid lines that are interconnected by the coupling.

In use, the pressurised supply of a fluid via second member 2 to first member 1 after interconnection of the members 1 and 2 ensures that member 1 is axially moved in a separating direction to its locked position and that it will remain in its locked position whilst the supply line remains pressurised. Thus accidental release of the coupling is prevented because rotation of collar 3 independently of first member 1 is prevented. Only after depressurisation of the supply line can member 1 be axially returned to allow rotation of collar 3 to release the coupling. Alternatively or additionally, a spacer (which may be associated with a ferrule for use in connecting a hose to the coupling) may be provided for insertion between collar 3 and a fixed surface on member 1 (for example a hose or ferrule end) to move member 1 to and maintain it in its locked position. Such a spacer provides for added safety.

It is to be understood that the invention encompasses an embodiment that does not include the locking feature provided by the second portions 38 of the recesses 37–38. Thus, for example, the recesses may have the one first depth, as per portions 37. Generally, an embodiment of the invention that does not include the locking feature would be used in applications involving low pressure flow of non hazardous fluids.

In use, O rings (not shown) in grooves 15 and 14 of male end 4 of first member 1 provide fluid seals between, respectively, surface 26 (of female end 17 of member 2) and surface 32 (of rotatable collar 3), thereby ensuring effective sealing of the coupling against fluid leakage and exclusion of dust and dirt.

It will be evident from the above description that a coupling according to the invention provides for quick connection and quick release between two coupling members in that such connection or release involves simply the partial rotation, manually, of a collar that is included as a part of one of the members. The invention also provides an embodiment that prevents accidental release of the coupling by preventing an unlocking rotation of the collar.

Also, an embodiment as described hereinabove having four lobes 16 that seat within recess portions 38 provides four areas of interengagement or "pressure bearing contact areas" between members 1 and 2 in contrast to only two such "pressure bearing contact areas" which are generally provided by prior art pin or staple-lock couplings. This provision of a greater number of "pressure bearing contact areas", it is thought, will allow couplings of the quick connect/quick release type concerned to be designed for operation at pressures greater than 3445 N/cm$^2$ (5000 psi).

The invention described herein is susceptible to variations, modifications and/or additions other than those specifically described and it is to be understood that the invention includes all such variations, modifications and/or additions which fall within the spirit and scope of the following claims.

I claim:

1. A coupling for interconnecting fluid flow lines including,
   a first tubular coupling member having a male coupling end and an opposite end for connection to a fluid flow line,
   a second tubular coupling member having a female coupling end and an opposite end for connection to a fluid flow line, the female coupling end including a rotatable collar within the female coupling end for receiving the male coupling end of the first member wherein the male coupling end of the first member and the rotatable collar of the second member include interengageable means for releasably interconnecting the male coupling end of the first member within the female coupling end of the second member by a partial rotation of the collar relative to the first member, the interengageable means being provided by a shaped portion of the male coupling end of the first member and a shaped portion of the rotatable collar of the second member located within the female coupling end.

2. A coupling as claimed in claim 1 wherein the shaped portions of the male coupling end of the first member and the rotatable collar of the second member provide for a plurality of interfacing pressure bearing contact surfaces.

3. A coupling as claimed in claim 1 wherein the rotatable collar is shaped to allow limited axial movement of the first member relative to the second member in a separating direction to lock the first and second members together in an interconnected position whereby separation of the first member from the second member is prevented unless and until the first member is axially moved back to an unlocking position.

4. A coupling as claimed in claim 2 wherein the shaped portion of the male coupling end of the first member includes a plurality of lateral shoulder structures and the shaped portion of the rotatable collar of the second member includes a corresponding plurality of recesses for receiving the shoulder structures.

5. A coupling as claimed in claim 4 wherein the recesses of the rotatable collar are formed in an axially facing end rim surface of the rotatable collar located within the female coupling end of the second member, the collar being shaped to allow passage of the shoulder structures of the first member therethrough.

6. A coupling as claimed in claim 4 wherein each recess includes a first portion and a second deeper portion whereby, when the male coupling end of the first member is fully inserted into the female coupling end of the second member, the collar is rotatable such that the shoulder structures of the first member engage in the recesses and, when the first member is then axially moved in a separating direction, the shoulder structures seat within the second deeper portion of the recesses to lock the first member to the second member.

7. A coupling as claimed in claim 4 wherein the lateral shoulder structures comprise four lobes that are equally spaced around the male coupling end, thereby providing four pressure bearing contact areas.

8. A coupling as claimed in claim 1 wherein the first and second tubular coupling members and the rotatable collar are generally cylindrical and the rotatable collar includes an annular flange having an outside diameter substantially the same as that of the female coupling end of the second tubular coupling member for facilitating manual rotation of the collar.

9. A coupling as claimed in claim 1 wherein the rotatable collar is held captive in the female coupling end by the crimping of an inwardly orientated annular lip on the female coupling end into an annular recess in the collar.

10. A coupling as claimed in claim 7 wherein the shaped portion of the rotatable collar includes a substantially square cross section for passage of the complementary shape of the male coupling end provided by the lobes.

11. A coupling as claimed in claim 10 wherein the substantially square cross section is formed by crimping an end portion of a generally cylindrically formed collar.

12. A female coupling for interconnecting a fluid flow line and a male coupling, the female coupling comprising:

a tubular female coupling member defining a longitudinal axis and having a female coupling end portion and connection means on an axially opposite end portion for connection to a fluid flow line; and an annular collar coaxially fixed within the female coupling end portion and rotatable relative thereto, the annular collar being for receiving a male coupling;

wherein the annular collar has shoulder means comprising an inwardly projecting transverse non-round shoulder for axially receiving a generally complementary outwardly projecting transverse shoulder of the male coupling and for releasably interconnecting the male coupling within the female coupling end portion upon a partial rotation of the collar relative to the male coupling.

* * * * *